March 3, 1959     F. W. HOBAN     2,875,877
VENDING MACHINES
Filed May 11, 1951     7 Sheets-Sheet 1
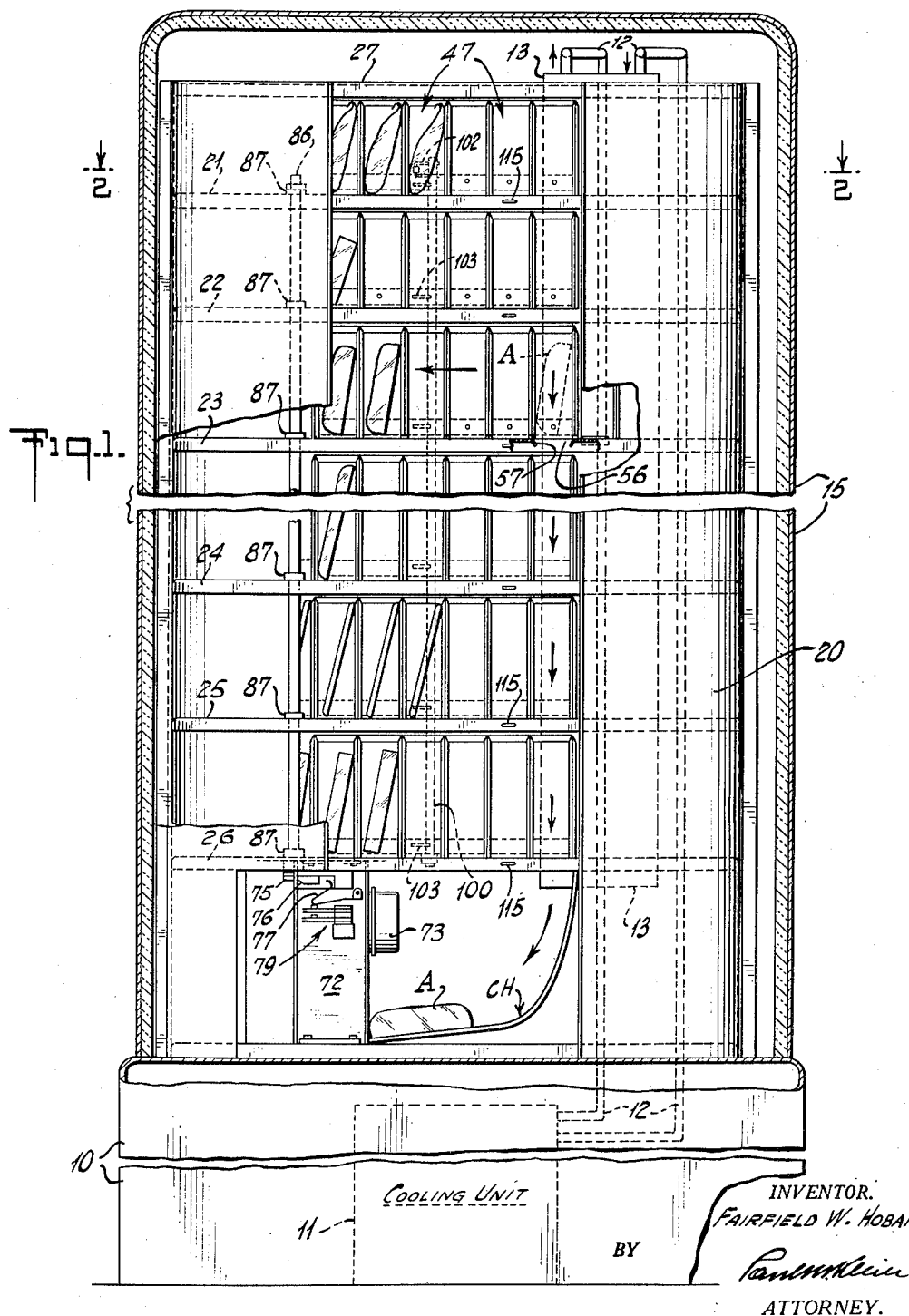
INVENTOR.
FAIRFIELD W. HOBAN.
BY
ATTORNEY.

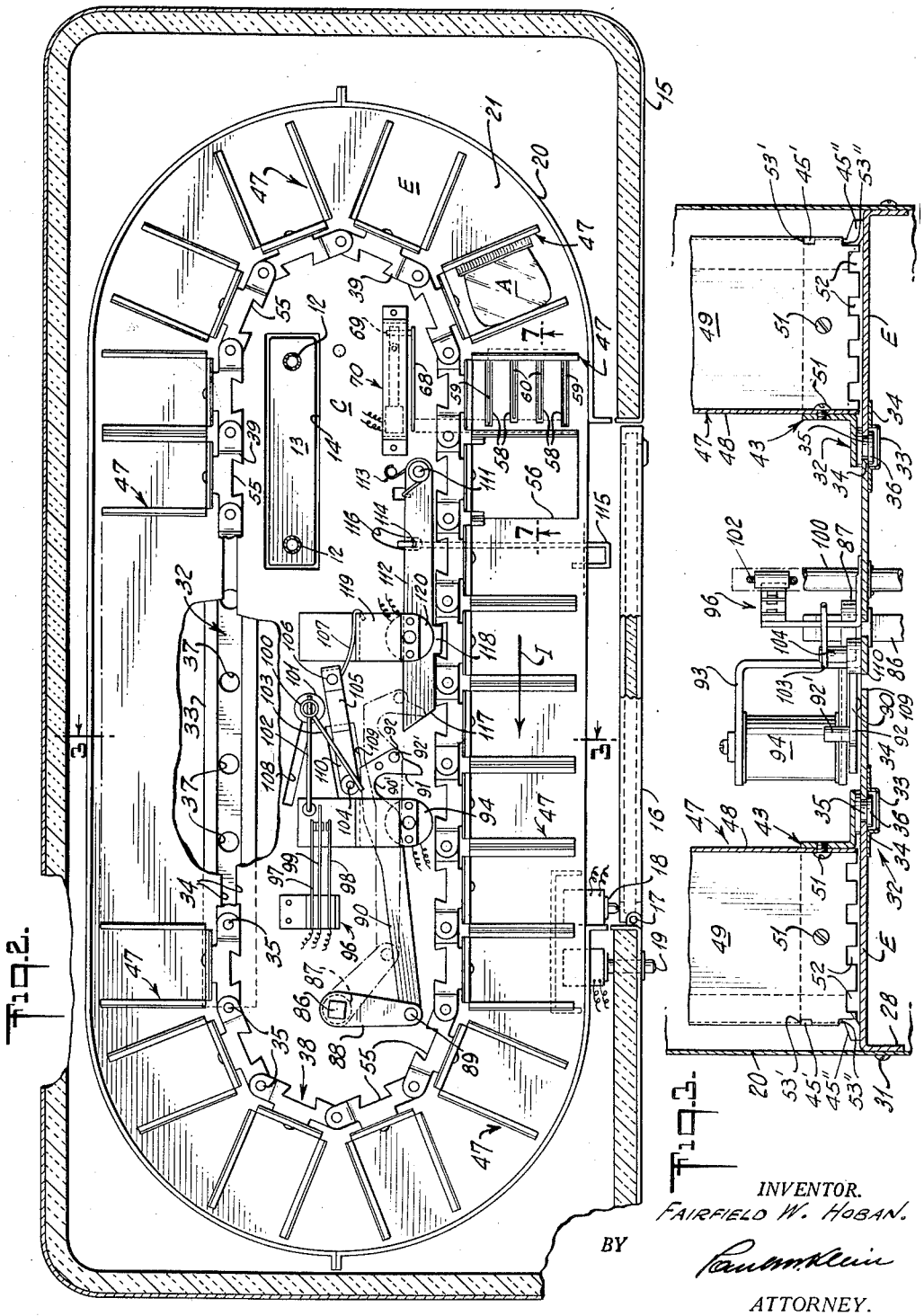

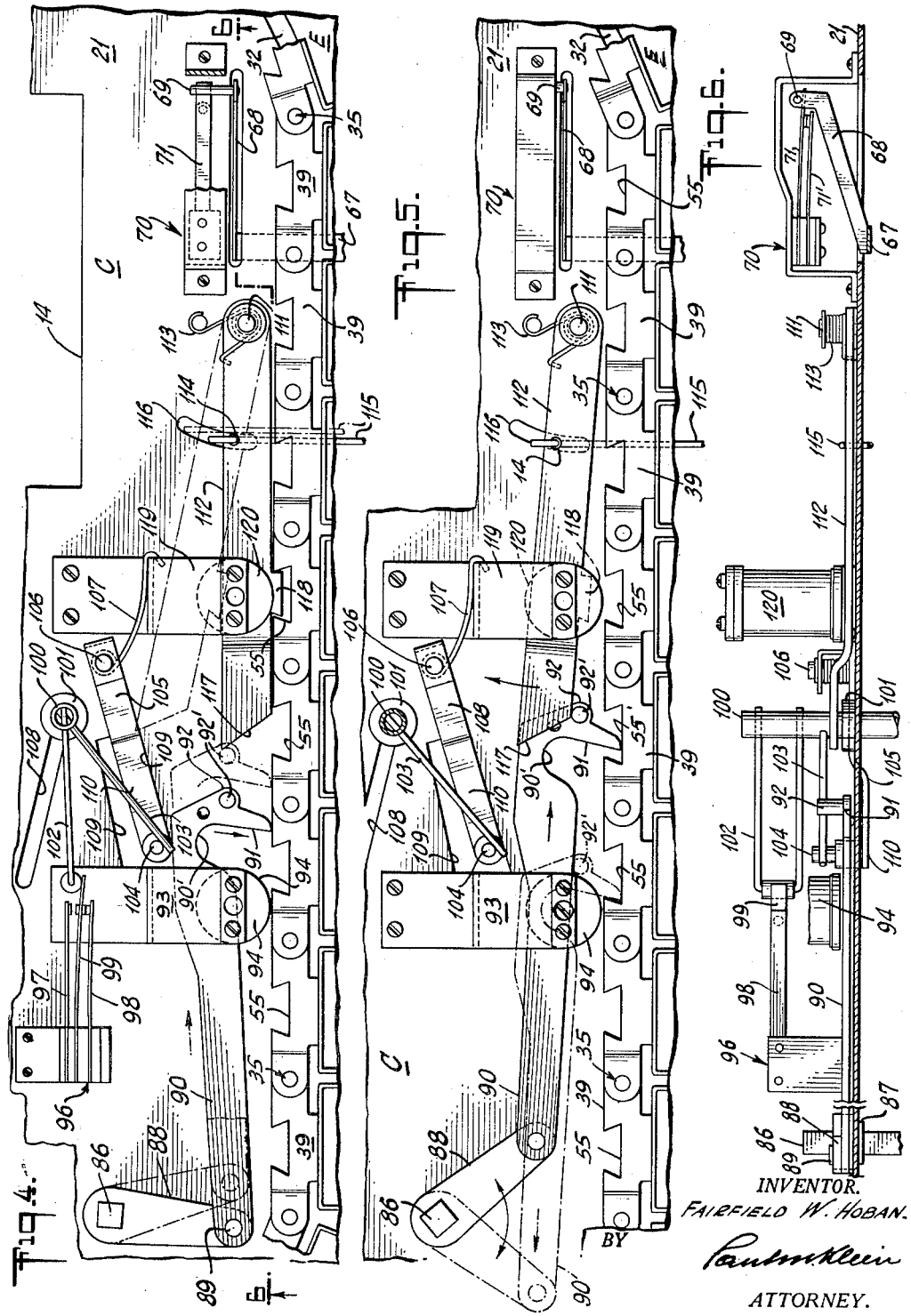

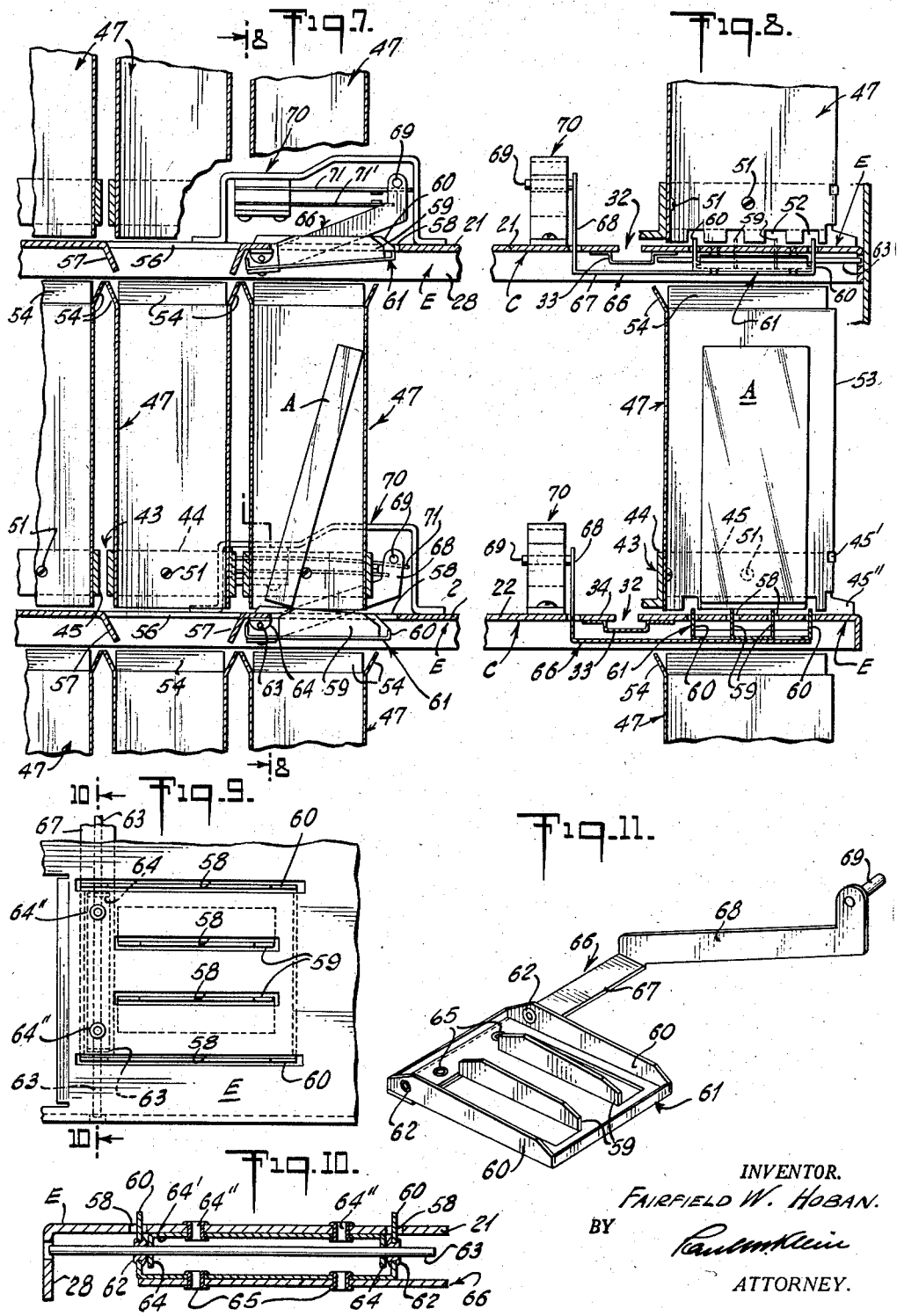

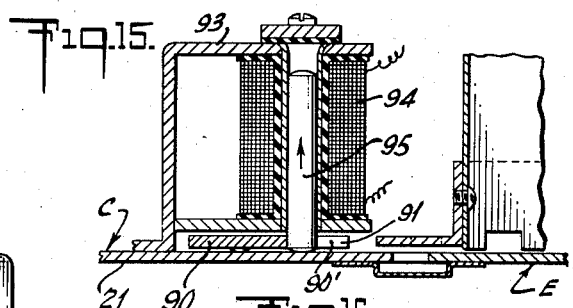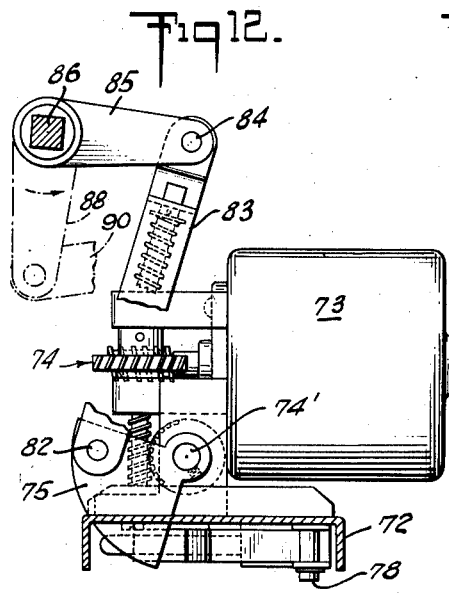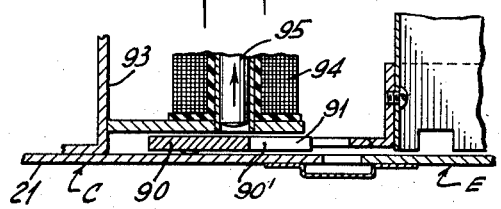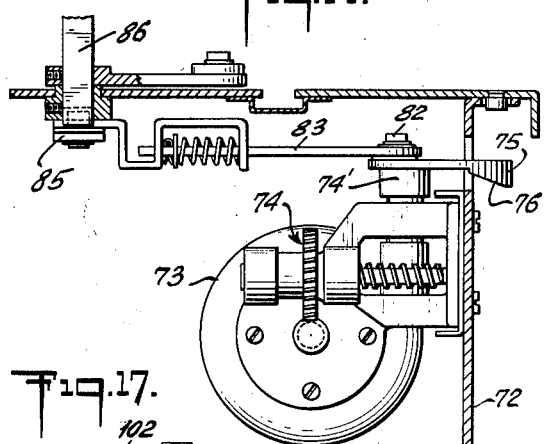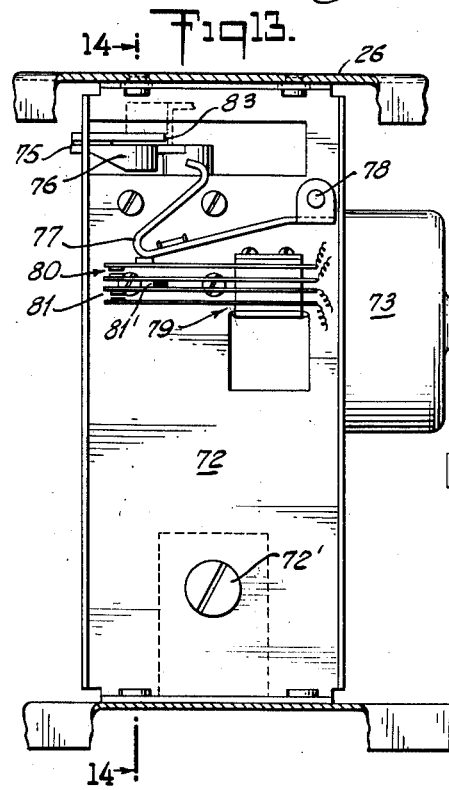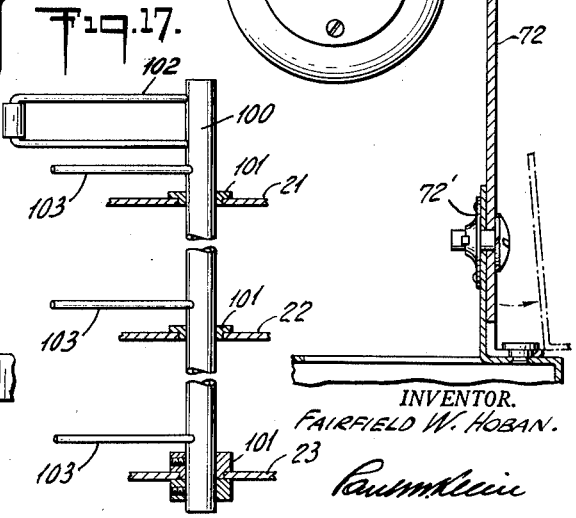

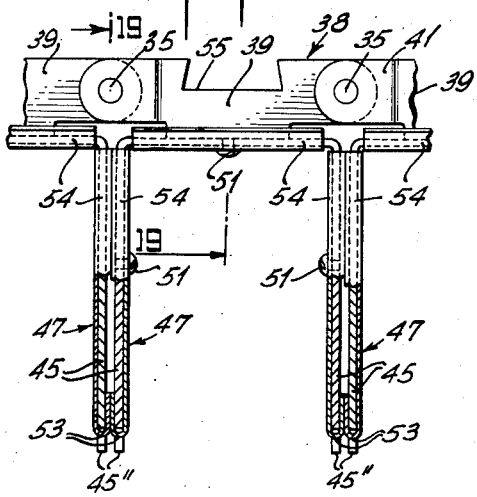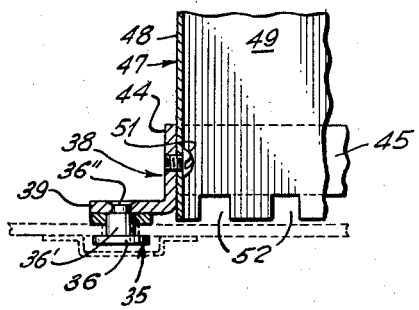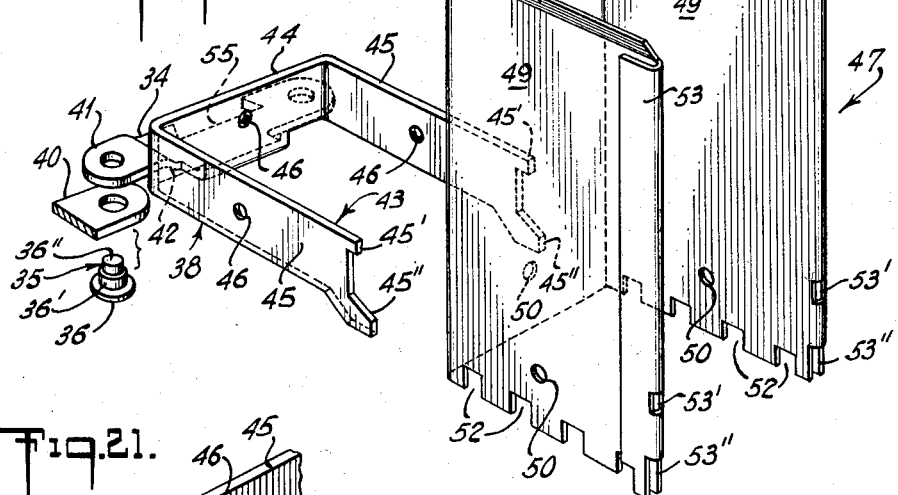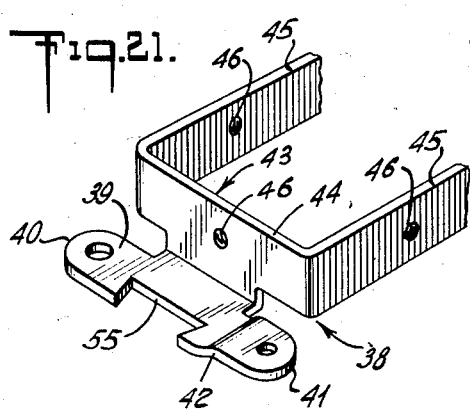
INVENTOR.
FAIRFIELD W. HOBAN.
BY
ATTORNEY.

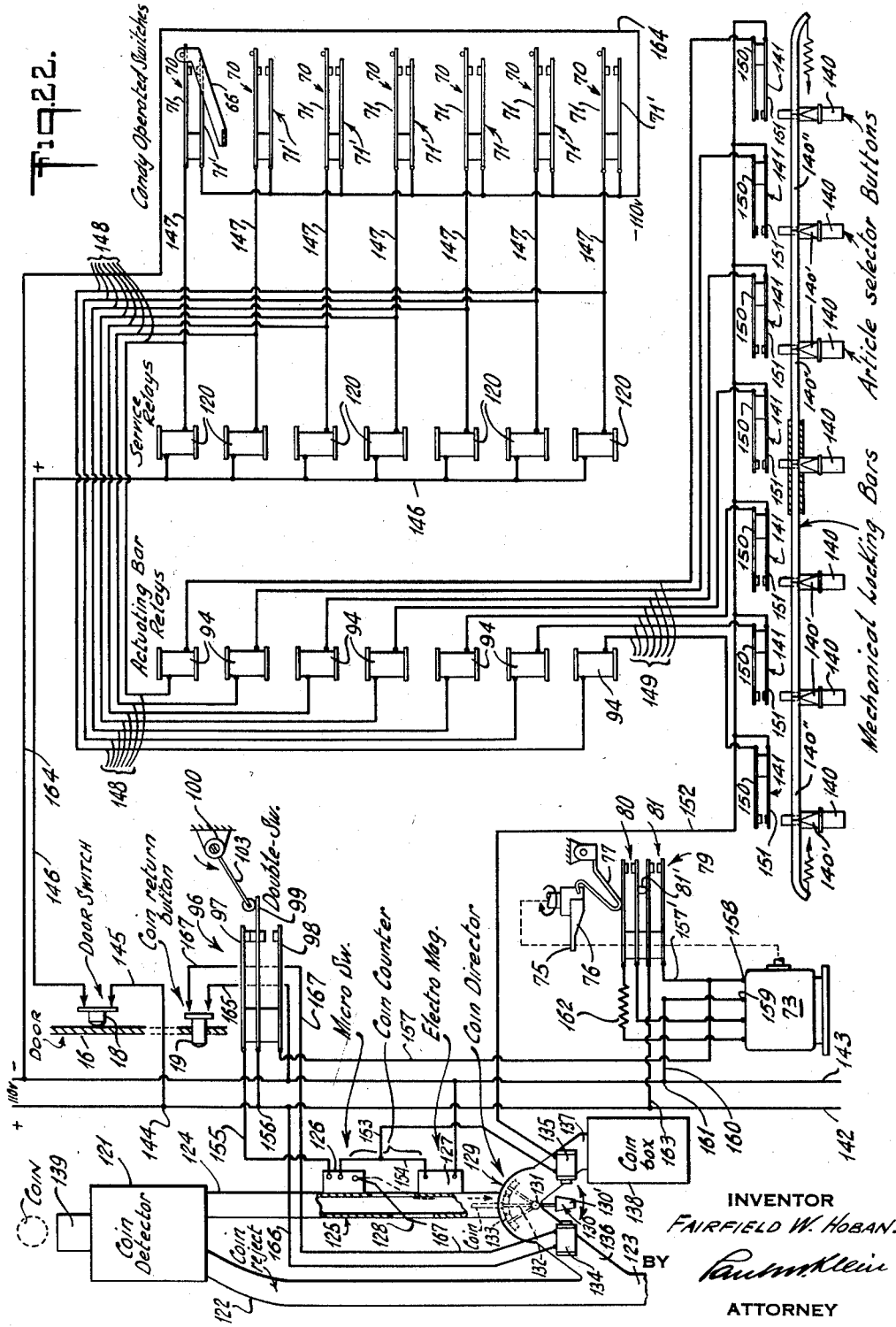

United States Patent Office 2,875,877
Patented Mar. 3, 1959

2,875,877

VENDING MACHINES

Fairfield W. Hoban, Babylon, N. Y., assignor to Norman Cogliati, Newark, N. J., John F. Hoban, New York, and J. Russell Callahan, Plandome Manor, N. Y., as trustees Application May 11, 1951, Serial No. 225,737

20 Claims. (Cl. 194—10)

This invention relates broadly to coin-controlled vending machines, and particularly to machines wherein packaged articles are required to be kept at certain low temperatures to prevent their deterioration.

Generally the present invention contemplates a novel construction of vending machines capable of being refrigerated throughout their entire height, and wherein is preferably employed an insulated cabinet provided with a normally closed, single door adapted to provide, when open, access to the interior of the cabinet, and wherein are employed within the cabinet a plurality of independent, superimposed platforms for supporting merchandise to be dispensed individually from any one of the platforms.

One of the major objects of this invention is the provision of a vending machine of the above described type, and wherein all of the platforms are provided wtih vertically aligned merchandise-discharge openings through which merchandise from any of the platforms may be dispensed to a point beneath the lowermost platform.

Another object of this invention is the provision of a vending machine of the type indicated wherein in all of the superimposed platforms are provided vertically aligned apertures, adapted for the reception of a cooling unit extending throughout substantially the entire height of the machine.

A more specific object of the present invention is the provision of a vending machine wherein is employed a series of superimposed platforms, and wherein in each of these platforms there is provided an endless raceway, and in which raceway is operatively mounted and guided an endless conveyer comprising a link chain, and wherein the links of the chains are pivotally connected with one another by pins so that the heads of the pins extend into the raceway, the latter having means, such as oppositely disposed flanges, for operatively engaging the heads not only for guiding them but also preventing their disengagement from the raceway, and wherein each of the links of the chain is composed of a substantially horizontal, flat portion terminating in rounded ends and an upwardly directed retainer-supporting frame, the latter being adapted to clear the platform and to removably hold an article retainer and to keep that retainer in a platform-clearing position, and wherein said flat portion of the link is provided at its interior face with a substantially swallow-tail recess, and wherein one rounded end of each link is raised so that the flat rounded end of the next adjacent link will pass beneath that raised end.

Another object of the present invention is the provision of a vending machine employing the above described features, and wherein said article retainers, removably connected with said frames, are open at both the top and the bottom, and wherein their upper edges are flared outwardly to form, so-to-speak, guide funnels for the merchandise passing through them.

Another object of this invention is the provision, in a vending machine, of an operating structure whereby the individual conveyers upon their respective platforms may be operated one at a time for the distance of approximately the length of one chain link.

A further object of this invention is to provide a conveyer-actuating mechanism which is not only controlled by coins inserted into the machine, but also by a plurality of electrical and mechanical devices, the structure and purpose of which devices and their cooperation with one another facilitating the selection and dispensation of articles from any one of the platforms.

A more general object of this invention is the provision of an efficient, relatively simple, and relatively inexpensive vending machine, in which the articles to be dispensed from the machine are kept at a desired temperature until discharged from the machine.

The foregoing and numerous other objects and important advantages of the present invention will become more fully apparent from the following description in conjunction with the accompanying drawings, which latter are held in a more or less diagrammatical form and are by no means intended to restrict the present disclosure to the specific structures illustrated and described, with the view that in the course of employment of the machine for the use with various types of articles, necessary changes both in the shape as well as in the function of and in the cooperation between the several electrical and mechanical devices employed may be required, and in which drawings:

Fig. 1 is an elevation, partly in section, of one of the many possible embodiments of a vending machine in accordance with the present invention;

Fig. 2 is an enlarged horizontal cross section through the machine, taken approximately along line 2—2 of Figure 1;

Fig. 3 is a fragmental, enlarged detail elevation, partly in section taken approximately along line 3—3 of Fig. 2;

Fig. 4 is a fragmental, enlarged detail plan view of a portion of the conveyer-actuating mechanism prior to effecting the movement of the conveyer;

Fig. 5 is a similar illustration to that shown in Fig. 4 with the mechanism in position for moving the conveyer;

Fig. 6 is an elevation of Fig. 4, partly in section taken approximately along line 6—6 of that figure;

Fig. 7 is a fragmental elevation, partly in section, taken along line 7—7 of Fig. 2, showing two superimposed platforms and article retainers, some being in registry with the vertically aligned discharge openings provided in the platforms;

Fig. 8 is a sectional view taken approximately along line 8—8 of Fig. 7, showing the operating mechanism for the weight-responsive switches;

Fig. 9 is a plan view of the mechanism for operating a weight-responsive switch;

Fig. 10 is a section taken approximately along line 10—10 of Fig. 9;

Fig. 11 is a perspective view of the operating mechanism for a weight-responsive switch;

Fig. 12 is a detail plan view of the motor employed in the device and its linkage to the chain-actuating shaft;

Fig. 13 is a fragmental elevation of the motor support and discloses a combination switch structure including a motor-circuit-holding and motor braking-circuit switch;

Fig. 14 is a side elevation of Fig. 13, partly in section, approximately along line 14—14;

Fig. 15 is an enlarged vertical section through a solenoid and its armature, serving a chain-actuating member, the armature being in its released position;

Fig. 16 is a fragmental section similar to that shown in Fig. 15 with the armature elevated;

Fig. 17 is a fragmental, diagrammatical elevation of a switch-operating bar for actuating a double-switch controlling the functions of several essential parts of the vending machine mechanism, including the motor;

Fig. 18 is an enlarged fragmental plan view, partly in section, of a chain link and an article retainer;

Fig. 19 is a fragmental detail elevation, partly in section, taken along line 19—19 of Fig. 18;

Fig. 20 is an exploded perspective view of a chain link and of an article retainer;

Fig. 21 is a fragmental perspective view of the chain link with its frame broken off; and Fig. 22 is a diagram of a typical arrangement of electric connections between the various electrical parts of the vending machine mechanism.

In the illustration shown in Fig. 1, numeral 10 denotes a hollow base forming a support for the vending machine of the present construction, and in which base is preferably housed a cooling unit 11, from which extend refrigerant-conveying conduits 12, to a cooling element 13, the latter being preferably suspended from top to bottom of the machine within vertically aligned apertures, such as aperture 14, seen in Fig. 2. This cooling element is adapted to keep the interior of the machine at a desired, low temperature. Supported by base 10 is cabinet 15 which is preferably insulated and encloses the entire vending machine structure. That structure is rendered accessible through a single door 16, see Fig. 2, preferably hinged along one of its sides, as at 17, and adapted to remain normally closed. In the vicinity of the hinge there will be noted a door-operated switch 18 adapted to be normally closed by the closed door, and to open when the door is opened. The purpose of that switch will be explained in connection with the electric diagram of Fig. 22.

In Figs. 2 and 22 there will be noted adjacent to switch 18 another, manually operable switch 19 which is intended, when depressed, to facilitate the return of coins inserted in the machine, when desired. Door 16 preferably extends substantially over the entire front of the cabinet and is constructed of transparent material such as glass or plastic to provide full view of the frontal portions of the cabinet interior. Within the cabinet is preferably arranged a frame 20 of substantially an oblong cross section, for supporting a plurality of superimposed, spaced platforms, indicated in Fig. 1 by numerals 21, 22, 23, 24, 25 and 26. There is preferably provided a cover 27 on top of frame 20.

A typical example of the flat, continuous, self-contained platforms used in the machine is shown in Figs. 2 and 3. They are preferably made from sheet material. The outer edges of the platforms may be dished as at 28 or may have a straight edge, in which case a peripheral strip, not shown, is attached to frame 20 for the support of the edge of the platform. When the platform is provided with dished edges 28, the latter are directly secured to frame 20 by screws 31 or other suitable means. Each of the platforms is provided with a raceway generally indicated at 32 in Figs. 2, 3 and 8, and which raceway consists of an endless channel formation 33 secured with its horizontal flanges to the undersurface of the oppositely disposed and spaced edges 34 of an interior or central portion "C" and an exterior portion "E" constituting, together with channel 33, the platform body, channel 33 serving as a rigid connection for the platform portions "C" and "E" and also as their reinforcement. The edges of the two platform portions form flanges extending over the web of channel 33 and serve for accommodating, engaging and guiding the recessed portions of pins 35 whose heads 36 are held beneath these flanges and within the channel and are thus prevented from disengaging the raceway. It will be noted from Fig. 2 that the web of channel 33 is perforated, as at 37, to permit the insertion of pins 35 through the perforations into the channel and against platform flanges 34.

The conveyers in the present device are composed of individual interconnected links forming an endless chain. Pins 35 connect the links of the endless chain conveyers, the major parts of which are adapted to operate above the platforms while being guided by way of their connecting pins within the raceways. The chain links may be best abserved from Figs. 18 to 21 and are generally indicated by numeral 38. They comprise a horizontal portion 39 provided with rounded ends 40 and 41, the latter end being raised as at 42 so that the flat end 40 of the next adjacent link will pass beneath raised end 41. In Figs. 19 and 20 pin 35 for connecting the links is shown in greater detail as being composed of head 36, a cylindrical guide portion 36' of a relatively large diameter adapted to first pass between the platform guide flanges 34, and then into a corresponding hole provided in the flat, rounded end 40 of one of two adjacent links, the upper end 36'' being reduced for passage into a corresponding small hole in the rounded raised end 41 of the other link, whereupon that reduced pin end is riveted in place.

Extending at right angles from horizontal link chain portion 39 is a retainer-supporting frame 43, composed of an interior central element 44, from which extend fork-like side members 45. The free ends of these members have upper short prongs 45' and longer forwardly projecting lower prongs 45''. Central element 44 as well as side members 45 have perforations 46. Frame 43 of the chain link is adapted to removably support an article retainer 47, comprising a channel-shaped structure having a rear wall 48 intended to abut with central element 44 of the frame and side walls 49 adapted to be held within side members 45. At the lower end of the retainer are provided apertures 50 adapted to register with apertures 46 of the frame and serving for the reception of rivets or screws indicated at 51 in Figs. 18 and 19, which are intended to fixedly hold the article retainer in the frame. It will be noted that the lower ends of the side walls of the retainer are notched as at 52 and that the front edges of walls 49 are bent backwards as at 53. Near the lower end of the inwardly bent portions 53 are apertures 53' through which the upper prongs 45' of side members 45 of the frame are adapted to pass. The extreme lower ends of front edges 53 of the retainers are bifurcated as at 53'' and are intended for the reception of lower prongs 45'' of the frame. It will be also noted that the upper edge of the retainer walls are flared or bent outward as at 54 to form funnel formations adapted to guide and to facilitate the passage of dispensed articles from the machine through a series of superimposed, aligned retainers.

An important feature of the horizontal portion 39 of the chain link is its swallow-tail recess 55, the purpose and function of which will become presently evident.

Referring now to Figs. 2 and 7 to 10, it will be observed that in each platform there is provided an opening 56 preferably having downwardly projecting flanges 57, indicated in Fig. 7, and that all of the openings 56 in each platform are aligned vertically with one another so as to facilitate the passage of an article held in a retainer which is brought into registry with any one of the openings in any one of the platforms through these aligned openings and the aligned retainers to a point beneath the lowermost platform. Articles held in some of the retainers are denoted by letter "A." In Fig. 1, one such article is shown in broken lines at the moment of its release, and its downward progress indicated by the downwardly directed arrows, the end position of the article being shown in full lines as it rests at the bottom of chute "CH" of the vending machine.

*Weight-responsive switch*

It will be observed from Figs. 2 and 7, that the portion of each platform immediately adjacent the right edge of opening 56 is provided with a plurality of slots 58, through which normally project longer and shorter vertical cams or ribs 59 and 60, constituting, as will be seen from Fig. 11, upright portions of a stamping 61. In ribs 60 are arranged apertures 62 for the reception of a fulcrum pin 63, see Figs. 9 and 10, lodged in flanges 64 of a yoke 64', the latter being attached to the bottom of the platform at 64".

With stamping 61 is connected by way of rivets 65 or otherwise a lever 66 having a substantially horizontal portion 67 and a vertical portion 68 from which latter projects a pin 69. That pin extends into a two-blade switch structure 70, having an upper long blade 71 and a shorter lower blade 71'. Pin 69 is adapted to engage blade 71 for causing it to contact lower blade 71', as will be presently explained.

Cams or ribs 59 of stamping 61 are adapted to normally project through slots 58 to above the platform and are adapted to be depressed to substantially a flush position with the upper platform surface by the weight of an article of merchandise "A" as indicated in Figs. 7 and 8. As a result pin 69 will compress blade 71 and cause it to contact with the lower blade 71' of the switch.

In Fig. 2 there is shown an arrow "I" indicating the normal, clockwise direction of progress of the link chain conveyer. Also in that figure an article of merchandise "A" is indicated held within retainer 47 approaching the weight-responsive operating mechanism for switch 70. That mechanism, as stated, is immediately adjacent to opening 56 of the platforms so that any article, before it is discharged through opening 56, must first pass and depress that operating mechanism and close the blades of switch 70.

*The chain-actuating mechanism*

The progress of the endless link-chain conveyer is intermittent, and obviously each of its intermittent movements must correspond to the length of one chain link. It will be understood of course that the conveyer may operate in a direction opposite to that indicated, provided that the weight-responsive switch mechanism is reversed and is located at the left of opening 56.

The mechanism illustrated in Figs. 2, 3, 4, 5 and 6 is typical and is repetitious for all platforms housed in the cabinet. The link chain conveyers of all platforms operate along their respective raceways 32, and their chain links 38 are guided by way of their hinge pins 35 within the raceways. Frames 43 extend beyond the raceways and above the platforms and form, together with the individual retainers, the outer course of the conveyers, whereas the recessed horizontal link portions 39 constitute the interior course of the conveyers.

Referring again to Fig. 1, beneath the lowermost platform 26 there will be seen a motor bracket 72, shown in detail in Figs. 12, 13 and 14, which is conveniently secured for bodily removal as at 72', and upon which is mounted a motor 73. This motor drives, by means of worms and worm gears, generally indicated at 74, and worm gear shaft 74', a segment 75 from the bottom of which extends a cam 76, which latter is adapted to engage once during each revolution of segment 75, a resilient, pivoted lever 77 hinged at 78. That lever is adapted to compress a combination switch structure 79 composed of simultaneously operable two-blade upper and two-blade lower switches 80 and 81. Upper switch 80 may be termed a shunt switch adapted, when closed, to shunt either a resistance or a portion of the motor winding into one motor field for reducing the motor speed during the end period of its run. Switch 81, on the other hand, may be considered a holding switch which is adapted to take over to supply energy to the motor after the latter has been first energized by the closing of another switch, which later is opened before the intended cycle run of the motor is completed. Switches 80 and 81 are separated by dielectric insert 81'.

Hingedly secured by pin 82 to segment 75 is one end of spring-loaded, compensating connecting bar 83, its other end being pivotally connected at 84 with a lever 85 of an operating shaft 86, having preferably a square cross section. Shaft 86 extends from below the lowermost platform to above the uppermost platform, as can be readily seen in Fig. 1, and is preferably lodged in suitable bearing means 87 supported by the several platforms.

Operatively engaged by shaft 86 above each platform is a lever 88 provided with a square opening for accommodating the shaft, as may be observed from Figs. 2 to 6. Hingedly connected with the free end of the lever at 89 is a chain-actuating member 90 which comprises a lever having at its free end an arcuate recess 90' and terminating in a hook formation 91. From a projection 92 of that hook formation there extends upwardly a pin 92'. Mounted above lever 90 is a supporting frame 93 for a solenoid 94 having an armature 95, which is normally released into the path of operation of member 90, as shown in Fig. 15, but may be withdrawn to clear member 90 in the manner indicated in Fig. 16 when the solenoid becomes energized. Chain-actuating member 90 is adapted to engage with its hook-shaped formation the swallow-tail recesses 55 of the horizontal link portions 39 when released by the withdrawn solenoid armature 95.

Between shaft 86 for actuating member 90 and the solenoid 94 there will be seen a double-switch 96, mounted on the uppermost platform only, said switch being composed of two outer, relatively short blades 97 and 98 and a longer, operative center blade 99, normally engaging blade 97, blade 98 being normally free.

Passing through all platforms is a switch-operating rod 100, shown in broken lines in Fig. 1 and indicated in full lines in Figs. 2 to 6, and illustrated in detail in Fig. 17. This switch-operating rod is lodged in suitable bearings on each platform as at 101. From the rod extends towards center blade 99 a blade-engaging or blade-operating arm 102, which latter, in its normal position, clears blade 99. Obviously there is only one such blade-engaging arm 102 connected with rod 100. Extending from the rod over each of the several platforms are rod-turning arms 103. These rod-turning arms are normally engaged on each platform by pins 104 extending from a hinged, spring-loaded lever 105. There is one lever for each platform. The levers are hinged at 106 and are normally biased by spring 107 in anti-clockwise direction, that is, towards rod-turning arms 103. The ends of all of these levers also tensionally engage the hook-shaped ends of chain-actuating members 90, and urge them normally towards dropped armatures 95 of solenoids 94 in the manner indicated in full lines in Fig. 2. Due to the fact that armatures 95 prevent members 90 from assuming their chain-engaging position, levers 105 are estopped from causing rod-turning arms 103 to move beyond the position shown in Fig. 2, whereby blade-engaging arm 102 remains in a blade-freeing position in respect to center blade 99 of double-switch 96. Obviously when any one of the solenoids 94 is energized, causing the withdrawal of armature 95 into the solenoid, thereby freeing its corresponding chain-actuating member 90 and releasing it toward the chain, as seen in full lines in Fig. 4, then rod-turning arm 103 will be moved in anti-clockwise direction, by the action of lever 105, sufficiently to turn rod 100 so that blade-engaging arm 102 will engage blade 99, causing the latter to free blade 97 and to move into contacting position with outer, shorter blade 98.

It will be observed from Figs. 2, 4 and 5 that in platform 21 there is provided a slot 108, extending upward and to the left of rod 100. Not only platform 21 but all of the platforms are provided with such slot, the latter serving for permitting the insertion from the top of the platforms of the rod and the passage through the slot of rod-turning arms 103. There will be also observed another slot 109 for accommodating the depressed portion 110 of hinged, spring-loaded lever 105.

*Chain detent*

In near vicinity of article discharge opening 56, see Fig. 2, there is hinged at 111 a spring-loaded detent 112, held under tension towards the link chain by spring 113.

That detent has an opening 114 through which projects the upwardly bent end of a manually operable push element 115, the lower portion of which is adapted to move within slot 116 provided in the platform. The free end of detent 112 is beveled at 117. To the right of the beveled end there is a projection 118 designed to normally engage recess 55 of any one of the chain links 38, being normally urged into that chain-engaging position by spring 113. Above detent 112 there is a mounting 119 supporting detent solenoid 120, which again is provided with an armature which is normally adapted to rest against the upper face of the detent, while the latter is in its full-line position indicated in Figs. 2 to 6. Solenoid 120 is normally de-energized and its armature merely rests upon the detent. When, however, the detent is moved by its push element 115 to its dotted line position shown in Fig. 4, the armature will drop in front of chain-engaging projection 118 and prevent the detent from reverting to its normal, chain-engaging position.

*Wiring Diagram*

In Fig. 22 there is disclosed one of the many possible embodiments of a wiring diagram applicable to the present device. There is shown a coin detector 121, which in itself is not a part of the present invention since such device may be purchased in the open market. From the coin detector extends a coin rejecting chute 122, which terminates in a combination chute 123, adapted to lead into main chute CH seen in Fig. 1. Extending also from the coin detector is a coin receiving chute 124 which leads into a coin counter 125. That coin counter comprises a micro-switch 126 and an electromagnet indicated at 127, and from the micro-switch extends a switch-actuating or switch-closing lever 128, which normally projects into the path of a coin released from the coin detector into chute 124. The coin thus dropping through that chute will deflect lever 128 to its broken-line position, and when its lowermost end reaches that position it will be attracted by the electromagnet 127 and will be temporarily held in that position. Below coin-counter 125 there is arranged a coin-director 129 which is shown in a more or less diagrammatical manner, as are also all other devices. Chute 124 extends through the coin counter to coin-director 129. That director comprises a housing in which operates a weighted lever 130, pivoted at 131, and having an upper extension 132 provided with a coin rest 133. The weight 130' of lever 130 is preferably magnetic. Spaced from the two sides or faces of that weight there are provided two electromagnets 134 and 135. From the housing of the coin-director extend divergent chutes 136 and 137, the latter leading into coin receptacle 138, while chute 136 is joined with chute 123 directed into main chute CH. When electromagnet 134 is energized, it will attract weight 130' causing it to swing to the left, whereby a coin supported by coin rest 133 will be caused to drop into chute 136, thus being delivered into the coin-and-merchandise-receiving chute CH shown in Fig. 1. When on the other hand electromagnet 135 becomes energized, weight 130' will be swung to the right, thereby causing a coin in chute 124 to drop into chute 137 to be delivered into coin box 138.

In Fig. 1 there is omitted a coin-receiving slot, such as slot 139 arranged on top of coin detector 121. Similarly there are omitted from that figure merchandise-selecting buttons 140 and selecting switches 141 operable by these buttons. It is intended that for each platform there is provided one of the merchandise-selecting buttons and its corresponding selecting switch. Upon the insertion of a coin into the machine, the desired button may be depressed, thus putting the mechanism of the machine into motion for the delivery of the desired article.

In diagram Fig. 22 there are indicated positive and negative main leads 142 and 143 fed from a source of electric energy which may be either of the 110 or 240 voltage, or may be of a much lower voltage, if desired. Extending from positive lead 142 at point 144 is a lead 145 extending to door-actuated switch 18, which is normally closed. From that switch extends lead 146 to one terminal of all detent solenoids 120, these terminals of the solenoids being connected in parallel. From the other terminals of the solenoids 120 there extend individual leads 147 to the upper or longer blades 71 of weight-responsive switches 70. At a point between solenoids 120 and switches 70 there branch off from leads 147 other leads 148, each extending to one of the terminals of solenoids 94 for the chain-actuating members 90. From the other terminals of solenoids 94 extend leads 149 to the upper blades 150 of the normally open selecting switches 141. The lower blades 151 are connected in parallel with one another through a lead 152 which extends to electromagnet 135 of the coin-director and from that electromagnet a lead 153 extends to a bridging lead 154 which connects one, say the lower terminal of micro-switch 126 and the upper terminal of electromagnet 127 of the coin counter. The other terminal of that electromagnet is connected to main negative lead 143. The upper terminal of micro-switch 126 is connected to outer blade 97 of double-switch 96 by lead 155; blade 97 is normally in contact with center blade 99, which latter is connected with positive lead 142 at 156. The other outer switch blade 98 of double switch 96, which is normally free, is connected by lead 157 to one terminal 158 of motor 73, the other motor terminal 159 is connected by lead 160 to main lead 143 at 161.

The combination switch structure 79 shown above the motor indicates that the upper switch blades 80 are connected through a resistance 162 to the terminals of the motor field, whereas the upper blade of switch 81 is connected by lead 163 to positive main lead 142, while the lower blade of that switch is connected through lead 157' with terminal 158 of the motor. From the negative lead 143 there extends a lead 164 to the shorter blades 71' of weight-responsive switches 70 and which blades are connected in parallel. The coin-return switch 19, which is normally open, has its lower terminal connected by lead 165 to negative lead 143 and a lead 166 extends from positive lead 142 to one terminal of electromagnet 134 of the coin-director. From the other terminal of that electromagnet lead 167 extends to the other terminal of switch 19. By the depression of coin-return button 19 solenoid 134 becomes energized, attracts weighted arm 130 of the coin-director and causes the coin, supported by the upper end 133 of the arm, to drop into chute 123, thus returning the coin.

As stated previously, the location of the coin-detector, the coin-counter, the coin-director as well as the location and arrangement of the selector buttons and the merchandise-selecting switches have not been shown in connection with the cabinet, since their disposition has no bearing upon the operation of the present device, and it is assumed therefore that these instrumentalities are suitably arranged to serve their respective purposes.

*Operation*

When a coin is inserted through chute 139 into the coin detector and the latter does not reject the coin and directs it into chute 124 and coin counter 125, the dropping coin moves lever 128 of micro-switch 126 from its normal, full-line to its broken-line position, whereby the micro-switch is closed and electromagnet 127 becomes energized, attracts and holds the lever in the latter position, while the coin drops upon coin rest 133 of coin-director lever 130.

The closing of micro-switch 126 establishes connection from positive lead 142 by way of center blade 99 and outer blade 97 of double-switch 96, through the micro-switch, through electromagnet 135 to all the lower switch blades 151 of selecting switches 141.

It is assumed of course that merchandise is carried by at least some of the conveyers and that the merchandise articles "A" held in the retainers over the mechanism of weight-responsive switches 70 depress these switches in the manner indicated in Figs. 7 and 8. From the negative main lead 143 lead 164 extends to all lower switch blades 71' of weight-responsive switches 70. Their upper longer blades 71 being moved into contact with lower blades 71' by the weight of the articles, connection is established through leads 147 and 148 to solenoids 94 and through the solenoids, through leads 149 to the upper switch blades 150 of selecting switches 141.

When now one of the selector buttons 140 is depressed and closes one of the switches 141, the connection between positive lead 142 and negative lead 143 becomes effected and the respective solenoid 94 is energized.

Prior to the operation of any of the selector buttons, all solenoids 94 are in a de-energized state and their armatures rest upon the platforms, as indicated in Fig. 15, and hold chain-actuating members 90 in the position shown in full lines in Fig. 2, while these members are pressed by spring-loaded pivot levers 105 against the dropped armatures. As now one of the solenoids becomes energized through the depression of its corresponding selector button, it will withdraw its armature from engagement by member 90, as shown in Fig. 16, thus freeing that member to move from its position indicated in full lines in Fig. 2 to the position shown in full lines in Fig. 4, that is, member 90 will rest against one of the chain links 39 of the conveyer, being caused to do so by the action of spring-loaded lever 105. That lever also causes, by means of its pin 104, the movement of rod-turning arm 103 in downward or counter-clockwise direction to the position also shown in Fig. 4, and in consequence of that movement of arm 103 spring-engaging arm 102 of rod 100 will cause the long center blade 99 of double-switch 96 to break contact with upper short blade 97 and establish contact with lower, outer blade 98. The breaking of the connection between blades 97 and 99 de-energizes electromagnet 127 which until then held lever 128 of the coin counter in coin-clearing position and will permit that lever to re-assume its full-line position, shown in Fig. 22, thus opening micro-switch 126. The engagement of blade 99 with blade 98 establishes connection from positive lead 142 through center blade 99, lower short blade 98 and lead 157 to terminal 158 of the motor, the negative main lead 143 being connected by lead 160 from point 161 to the other terminal 159 of the motor. Thus the motor is energized and causes the rotation of segment 75, which in turn translates its rotary motion through spring-loaded, compensating connecting bar 83 to lever 85, thus swinging shaft 86 through an arc approximating that indicated by the double arrow in Fig. 5. See also Fig. 12.

The motion of shaft 86 is transmitted to all chain-actuating members 90. Members whose solenoid has not been energized remain in the position shown in Fig. 2 which is their inoperative or idling position, being held in that position by the dropped armatures of their solenoids 94; they will reciprocate, changing from their full-line to their broken-line position and revert to their full-line position, as indicated in Fig. 2. However, the chain-engaging member 90 whose solenoid has been energized by the depression of one of the selector buttons 140 assumes the position shown in full lines in Fig. 4 and is now caused to move along the chain, first to the broken-line position indicated in Fig. 4 and then into the full-line position shown in Fig. 5. In the broken-line position of member 90 indicated in Fig. 4, pin 92' of the member will engage the beveled face 117 of detent 112, and as member 90 progresses in right-hand direction, which is opposite to that of the normal movement of the chain, detent 112 will be lifted out of engagement with the chain, as shown in full lines in Fig. 5, and member 90 will drop into engagement with recess 55 of the chain link 39.

As now the movement of member 90 is reversed by the backward swing of shaft 86, member 90 will cause the chain to advance in clockwise direction until member 90 assumes the broken-line position shown in Fig. 5. At that position of the member, the interior recessed, arcuate portion 90' of member 90 will come to rest just below the armature 95 of solenoid 94. Thus when the solenoid becomes de-energized the armature will drop against the platform and into the future path of operation of member 90. The de-energizing of solenoid 94 will take place the moment the depressed selector button 140 is released and selecting switch 141 is opened.

While shaft 86 is being operated by segment 75, the latter continues to rotate so that its cam 76 engages lever 77, which in turn closes switch combination 79. The closing of that switch combination serves two purposes: The upper switch 80 shunts into one of the motor fields a resistance, such as resistance 162, whereas the lower switch 81 establishes connection between the positive and negative main leads 142 and 143, through lead 163 to the motor. Meantime shaft 86 causes member 90 to assume its starting position, shown in full lines in Fig. 2, during which operation member 90 slides along dropped armature 95 of solenoid 94 and exerts pressure against spring-loaded lever 105 and brings the latter to its normal position shown in that figure. In consequence of this movement of member 90 and lever 105 rod-turning arm 103 reverts to its normal position, and blade-engaging arm 102 releases blade 99 so that the latter breaks the contact with short, outer blade 98 and establishes contact with upper, short blade 97. During and after the disengagement of blade 98 by blade 99 no current would flow to the motor. Meantime holding switch 81 is closed by segment 75 and assures supply of energy to the motor. During the final movement of segment 75, while still depressing lever 77, the resistance shunted into the motor winding slows down the speed of the motor considerably to almost a standstill as segment 75 approaches its original starting position shown in Figs. 12 and 13.

The movement of the link-chain conveyer, as described in the foregoing, causes the article held in the retainer above weight-responsive switch-operating member 61 to move over opening 56 so that it will be released to pass through all of the openings and the empty article retainers in registry with the openings until the article lands on chute CH beneath the lowermost platform of the device for removal by the purchaser.

As the coin is inserted in coin-receiving chute 139 and passes through coin-detector 121 and coin counter 125, it comes to rest upon coin rest 133. When the desired selector button is operated, connection is established, as stated before, through electromagnet 135, which attracts coin-director arm 130, swings weight 130' of that arm in anti-clockwise direction, thus releasing the coin and directing it into the coin receptacle 138.

If by chance the purchaser wishes to forego the purchase of an article for which he has inserted a coin into chute or slot 139, he may do so by depressing coin-return button 19. The closing of the switch controlled by button 19 will energize electromagnet 134, which in turn will attract the weight 130' of lever 130 and cause the coin support to move in clockwise direction, thus releasing the coin into chute 136 connected with chute 123, which latter terminates in main chute CH of the vending machine, so that the coin becomes available to the prospective purchaser.

*Placement of merchandise*

When the vending machine is to be filled with merchandise, door 16 is opened. The opening of the door opens door switch 18. While the door switch is closed, and as long as merchandise is held in any one of the article retainers over the weight-responsive mechanism of switches 70, the respective detent solenoids 120 become energized, thereby causing the armatures of these solenoids to be drawn upwards. Leads 145 and 146 are normally connected through door switch 18, with positive main lead 142. Lead 146 connects one terminal of all detent solenoids 120. When door switch 18 is opened by the opening of the door, connection to detent solenoids 120 from main lead 142 is broken, consequently they become de-energized and their armatures drop against the detents.

To permit the stocking of merchandise on all of the platforms it is necessary that their respective conveyers may be moved freely by hand so that mechandise may be successively inserted into the several article retainers, starting with the retainer at the left of opening 56. In order to permit the unrestricted movement in clockwise direction of the conveyers, detents 112 have to be held in chain-disengaging position. That is accomplished by manually moving detent push element 115 from its normal, full-line position shown in Figs. 2 and 4, to its broken-line position, thus causing detent 112 to assume its broken-line position indicated in Fig. 4. At that position of the detent the armature of the de-energized solenoid 120 will drop into the path of projection 118 of the detent and prevent the latter from assuming its normal, chain-engaging position. Due to the disengagement of the detent from the conveyer, at which position the detent is held by the armature of solenoid 120, the conveyer chain is free to be moved by hand in clockwise direction so that every one of the empty article retainers can be filled with fresh merchandise, except those article retainers which will finally register with opening 56 of the platforms. When the conveyers of all of the platforms are stocked and the door is closed, switch 18 is also closed and establishes connection from positive main conductor 142 to one of the terminals of detent solenoids 120, whereas the weight-responsive switches 70, being closed by the weights of the articles held in the retainers adjacent to the right edge of opening 56, will establish connection from the negative main conductor 143 to the other terminals of detent solenoids 120, thus energizing the latter and causing the armatures to clear projections 118 of detents 112, whereby the detents are caused by springs 113 to assume their normal, chain-engaging position. Thus the vending machine is now ready for operation in the manner stated.

One of the important advantages derived from the construction of the conveyers resides in the fact that the merchandise is dispensed from the machine in order of its age. When, for instance, the conveyers are only partly emptly, they are first moved in counter-clockwise direction until an article appears at the left front end over the platform. Then the empty retainers are filled, one by one, as the conveyer is moved in clockwise direction until an article-holding retainer appears at the right, above the weight-responsive mechanism next to opening 56.

It is to be noted that the chain links and the article retainers of all conveyers are interchangeable. Also exchangeable are all the various instrumentalities employed upon each platform; thus the hook-shaped chain-actuating members 90, their lever organization for operating them by shaft 86, their solenoids 94, spring-loaded levers 105, chain detents 112, the latter's solenoids 120, the rod-turning arms 103 of switch-operating rod 100 and all other parts related to these instrumentalities are made alike for ready interchangeability.

Another important feature of the vending machine of the present invention are the vertically aligned discharge openings for the merchandise and the automatically aligning article retainers adapted to always register with these openings, and which openings are located exteriorly relative to the raceways for the conveyers, while the vertically aligned apertures for the reception of the cooling unit of the machine are preferably disposed interiorly in respect to these raceways.

Another salient point of the present invention will be found in the chain-actuating mechanism in which is employed a single shaft passing through all of the platforms housed in the vending machine, and which shaft is adapted to oscillate within defined limits of an arc and translates its movement simultaneously to all of the hook-shaped chain-actuating members in the machine, thus causing them to reciprocate, also within defined, predetermined limits, their movement commencing from a starting point, in the direction opposite to the normal direction of progress of the chain conveyer, and continuing toward a temporary stopping point, and, upon reaching that point their movement is reversed and is finally stopped when the members re-assume their starting position.

In the electric diagram shown in Fig. 22 it will be noted that for some of the several electrically operated devices there are arranged individual branch circuits extending from or being connectable by means of different control switches.

It is to be understood, of course, that the description of the different mechanical and electrical devices employed in the vending machine in accordance with the present invention, serves merely for explanatory purposes.

One of the important elements of the present vending machine, whereby the selection of different merchandise is effected, resides in the merchandise selector buttons. The construction of these buttons is such that only one of the buttons may be depressed at one time. Once one of the buttons is depressed it will move, by its wedge-shaped structure 140', a plurality of spring-loaded bars 140'' into such position in respect to the other selector buttons that the latter can not be operated. Inasmuch as selector button devices similar to the one shown are well known in the art, no specific drawing and description are submitted. Due to the fact that the aforesaid automatic locking means in a selector button structure are well known, the structure of the selector buttons illustrated in Fig. 22 does not constitute a patentable feature of this invention.

In order to facilitate explaining the cooperation of the principal features of this invention with one another it became necessary to resort to the showing and the description of specific embodiments of the various instrumentalities intended for accomplishing certain basic, correlated functions upon which the faultless operation of the instant vending machine depends. These specific embodiments shown and described will meet the requirement in vending machines intended for handling certain types of merchandise, whereas in machines for handling different merchandise the construction of these instrumentalities may have to be altered, although they serve their respective intended purposes.

Having thus described the present invention, what is claimed as new is:

1. In a coin-operated vending machine, a plurality of superimposed platforms, each platform having an endless raceway and an endless link chain operative along the raceway, the links of the chain being adapted to convey merchandise over the platform, each of the platforms having a merchandise-discharge opening, the discharge openings of all platforms being in vertical alignment, each platform having a weight-responsive switch disposed adjacent the discharge opening and being adapted to become actuated by the weight of the merchandise approaching said discharge opening; each link of the chain comprising a substantially horizontal portion, a frame extending therefrom, a merchandise holder removably associated with the frame and being open at its top and bottom and having outwardly flared upper edges, said frame and said holder being spaced from the platforms, the holders of all chain links being adapted, when moved over the openings in the platforms to form a continuous chute for guiding a released article of merchandise through the openings of the platforms to a point beneath the lowermost platform; substantially swallow-tail recesses provided at the interior edges of the horizontal link portions; a spring-loaded detent operative upon each platform and normally engaging the recess of one of the links to prevent movement of the chain, a chain-actuating member also operative upon each platform, and being adapted, when operated, to first cause the disengagement of said detent from the recess of that one link, and to hold the detent in the recess-disengaging position, and then to engage the recess of another link for moving the chain for a distance equaling the length of one link.

2. In a coin-operated vending machine as in claim 1, said detent and said chain-actuating member having cooperating means for first facilitating the disengagement of the detent from the recess of a chain link and thereafter for keeping the detent in a link-clearing position, while said chain-actuating member is brought to a link-engaging position for moving the chain.

3. In a coin-operated vending machine according to claim 1, a solenoid disposed above each of said chain-actuating members and having an armature normally extending into the path of operation of each respective member, thus forcing it to idle, when actuated, thereby preventing the member from engaging and moving said detent to a link-clearing position and further preventing the member from assuming a chain-contacting position; a plurality of normally open, hand-operated solenoid-controlling switches, one for each solenoid, adapted, when one of the switches is closed, to energize its respective solenoid, thereby causing the latter's armature to free said member to assume its operative position.

4. In a coin-operated vending machine according to claim 1, a common operating shaft for the chain-actuating members on all platforms and passing through the latter, a motor for operating said shaft; a solenoid adjacent each of said chain-actuating members and having an armature normally extending into the path of operation of said members while the solenoids are de-energized, thereby causing the members to assume their inoperative position and to idle when moved by said shaft; a normally open electric circuit having one branch including said motor and another branch including said solenoids; a double-contact switch, including a movable center blade, mounted upon one of the platforms and comprising a normally open contact pair in the motor branch circuit and a normally closed contact pair in the solenoid branch circuit; a switch-control rod projecting through all platforms and having a single switch-actuating arm for operating said center blade and a plurality of rod-turning arms, one of the latter arms for each platform; a spring-loaded, pivotally mounted lever for each platform adapted to simultaneously and tensionally bear against both the rod-turning arm and said chain-actuating member of each platform; the chain-actuating members, while held by said solenoid armatures in inoperative or idling position, arresting said switch-control rod, by way of said rod-turning arms, at a position at which said switch-actuating arm clears said center blade of the double-contact switch; a coin-controlled, hand-operable, normally open switch in said normally open electric circuit; said operating shaft and said switch-control rod being adapted to be rendered operative when said circuit is closed by the closing of said hand-operable switch, whereby the solenoid of one of the chain-actuating members becomes energized and causes its armature to free the chain-actuating member to move to its operative position, that movement of said member releasing said spring-loaded lever to cause said rod-turning arm to rotate the switch-control rod so that the latter's switch-actuating arm engages the center blade of the double-contact switch and closes the contact pair of the motor branch circuit, thereby energizing the motor, the latter actuating said shaft, the movement of the shaft causing the operation of said freed chain-actuating member, which in turn advances the chain for a distance of one chain link.

5. In a refrigerated, coin-controlled, electrically operated vending machine including a coin detector, a coin counter, a coin return, a coin receptacle and a cabinet having a door; a switch operable by the door to a circuit-opening position when the door is open and to a circuit-closing position when the door is closed, a plurality of superimposed and spaced merchandise-supporting platforms enclosed in the cabinet and accessible only through the door when open, each platform having an endless raceway and an endless merchandise-conveying link chain operative in the raceway, a merchandise-discharge opening in each platform exteriorly of said raceway and an aperture interiorly of the raceway, the discharge openings and the interior apertures of all platforms being vertically aligned, respectively, a cooling element for the cabinet passing through said aligned apertures of the platforms, normally open weight-responsive switches, one for each platform, and adjacent each merchandise-discharge opening, and being adapted to be closed by the weight of merchandise conveyed by the chain toward said opening, a solenoid-controlled chain-actuating mechanism for each platform, a spring-loaded chain detent for each platform, a solenoid for each detent controlled by the door switch, manually operated means, one for each detent, for disengaging the detent from the chain, a motor, motor-driven means for operating said chain-actuating mechanism of each platform; a plurality of merchandise-selecting switches; an electric circuit having a plurality of branch circuits including the coin counter, the coin return, the cabinet door switch, the detent solenoids, the weight-responsive switches, the motor, the solenoids of the chain-actuating mechanism, the merchandise-selecting switches, one for each platform, said selecting switches being adapted to govern the operation of the motor and of the chain-actuating mechanism of any one selected platform; a double-switch having a movable center blade and including a pair of normally closed holding contacts in a branch circuit which latter includes the coin counter, the selecting switches and the solenoids of the chain-actuating mechanism; and another pair of normally open contacts in the motor branch circuit; and a device for operating the center blade of said double-switch, said device being adapted to normally assume a center-blade-clearing position.

6. In a refrigerated vending machine according to claim 5, said motor-driven means comprising in combination a common operating shaft movable by said motor and extending through all platforms, said chain-actuating mechanism comprising a substantially hook-shaped chain-actuating member for each platform operable by said shaft and being adapted, when released to its chain-engaging position, to move the chain one link length at a time, a solenoid with an armature mounted above and controlling the position of said member relative to said chain, the armature being adapted to normally prevent engagement of the chain by said member, but being further adapted to release said member to a chain-engaging position when the solenoid becomes energized by the operation of one of the selective switches; a spring-loaded lever for normally urging said chain-actuating member toward the chain, and for causing the member to engage the chain when said solenoid is energized and the armature releases said member and the lever; said lever also causing, when thus released, to bring said device for operating said double switch to a switch-engaging position at which the holding contacts are opened and the motor contacts are closed; said spring-loaded detents for each platform being adapted to normally engage one link of their respective chains to prevent inadvertent movement thereof; said chain-actuating member being adapted, when operated, to first engage and dislodge said detent from the chain during its initial movement, in the direction opposite to that of the normal chain movement, and prior to engaging the chain; a solenoid for the detent having an armature, the electric circuit for energizing the detent solenoid being controlled by both the cabinet-door-operable switch and the weight-responsive switch of each platform, said circuit being normally closed, while the door, the door switch and the weight-responsive switch are closed, and energizes the detent solenoid, thereby causing the latter's armature to assume a detent-clearing position; and, when the door is open, and thus the door switch is opened, the circuit is broken and the solenoid becomes de-energized, thus releasing the armature against the detent; said manually operable means for the detent comprising a handle associated with the detent and being accessible only while the door is open, said handle being adapted for moving the detent manually out of engagement with the chain to a position past said released armature, thus causing the latter to drop and to hold the detent in chain-disengaging position to facilitate manual operation of the chain; the closing of the door and of the door-operable switch causing the closing of the solenoid circuit and the raising of the armature, the latter then releasing the detent to reassume its chain-engaging position.

7. In a vending machine according to claim 5, said device for operating the center blade of said double switch comprising a rod extending through the platforms and having a switch-operating arm and a plurality of rod-turning arms, one for each platform; a substantially hook-shaped chain-actuating member reciprocatingly mounted upon each platform and forming a part of said chain-actuating mechanism; a spring-loaded lever pivotally lodged on each platform and tensionally engaging said chain-actuating member and urging it toward the chain, said lever also tensionally engaging said rod-turning arm and urging it in the direction toward the chain; the solenoid for the chain-actuating mechanism having an armature disposed above said chain-actuating member and normally preventing the latter from engaging the chain, said armature being adapted, when its solenoid becomes energized, to release said member to a chain-contacting position, whereby said rod-turning arm is also released and is caused, by the action of said spring-loaded lever, to swing the rod, thus causing its switch-operating arm to swing toward the chain and to engage the center blade of the double switch, thereby opening the latter's holding contacts and closing its motor circuit contacts, causing the motor to become energized and to move the chain-actuating member first in a direction opposite to that of the normal chain movement, said spring-loaded lever then causing said member to operatively engage the chain, following which said member is caused to move by said motor in reverse direction, that is in the normal direction of movement of the chain, whereby the chain is caused to progress for the distance of one chain link, said progress of the chain causing an article of merchandise held by the link above the weight-responsive switch to move over the merchandise-discharge opening, through which the article of merchandise is dispensed from the machine.

8. In a vending machine according to claim 5, the motor branch circuit containing, in addition to the normally open contacts of the double-switch, a switch combination including a holding switch for the motor circuit and a resistance-shunting switch, the latter serving for slowing down the motor, both these switches of the switch combination being operable simultaneously, and means actuated by the motor for operating these switches successively to closing and opening positions.

9. In a vending machine according to claim 5, the coin return branch circuit including an electromagnet and a normally open manually operable switch for closing the circuit to energize said electromagnet, the latter, when energized, being adapted to cause the return of coins deposited in the vending machine when desired.

10. In a coin-controlled vending machine including a substantially closed cabinet and a hinged door for providing access to the interior of the cabinet, a door-operated switch normally closed by the closed door, a vending machine operating structure within the cabinet, the combination with said cabinet of a series of super-imposed merchandise-supporting platforms having vertically aligned merchandise discharge openings, endless merchandise conveyers operative upon each of the platforms and adapted to facilitate the discharge of merchandise from any platform through said aligned openings to a point beneath the lowermost platform, said platforms having endless raceways, said endless conveyers comprising link chains guided in these raceways, means within the raceways and corresponding other means forming parts of said link chain for preventing the latter's disengagement from the raceways; said link chains being composed of interhinged links having engageable recesses at their interior faces and exteriorly arranged article-accommodating means operative above said platforms adapted to successively move articles of merchandise over the discharge openings as said link chain is operated; normally open weight-responsive switches disposed adjacent said openings and being adapted to be closed by the weight of articles approaching said openings immediately prior to their discharge; said operating structure comprising, in combination, chain-actuating members, one for each platform, adapted to engage the recesses at the interior faces of the links when brought to their operative position; spring-loaded detents normally engaging said link recesses to prevent inadvertent movement of the chains; a solenoid with an armature for each chain-actuating member for normally holding the latter, by way of said armature, in inoperative and idling position while the solenoid is de-energized, and being adapted to release said member into chain-engaging, operative position by withdrawing said armature when the solenoid becomes energized; a shaft passing through all platforms and being adapted to impart a reciprocating movement to said chain-actuating members; an electric motor for moving the shaft; a linkage between the motor and the shaft for imparting an arcuate movement to the latter; a double-switch supported upon one of the platforms and having two outer blades and an operative center blade extending beyond the outer blades, the center blade and one of the outer blades being normally in circuit-closing position, while the other outer blade and the center blade are normally in a circuit-opening position; a rod for operating said double-switch passing through all of the platforms and having a blade-engaging arm for said center blade and a plurality of rod-turning arms, one for each platform; a spring-loaded lever pivotally supported by each platform and tensionally engaging both said chain-actuating member and said rod-turning arm of each platform and normally urging said member toward the armature of its solenoid; said blade-engaging arm normally clearing the center blade of the double-switch; a normally deenergized solenoid and an armature for each of the detents, the armatures normally resting against the detents without interfering with the normal operation of the detent, said detent-solenoids being adapted to become energized by the closing of their corresponding weight-responsive switches while the door-operated switch is closed; a source of electric energy and circuit and its branches supplied by the source; said center blade of the double-switch being connected with one potential of that source; one of the terminals of said weight-responsive switches being connected in parallel with the other potential of the source; a plurality of normally open, manually operable article-selecting switches, one for each platform; one of the terminals of said selecting switches being connected in parallel with that one source potential through said one outer blade of the double-switch and the center blade which is normally in circuit-closing position with that one outer blade, the other terminals of the selecting switches being connected individually and in series with one of the terminals of the solenoids for the chain-actuating members, the other terminal of these solenoids being individually connected with the other terminals of said weight-responsive switches, these other terminals of the latter switches being also connected individually and in series with one of the terminals of the detent solenoids, the other terminals of the detent solenoids being connected in parallel, via said door-operated switch, with that one potential of the source; a simultaneously operable switch combination for the motor comprising a motor-circuit-holding switch and resistance-shunting switch, means driven by the motor for first closing and for subsequently opening said switch combination and thereby reducing the motor speed; the other, normally free outer blade of the double-switch being connected with one terminal of the motor, and being adapted, when contacted by said center blade, to connect that one motor terminal with that one energy source potential, the other motor terminal being connected with the other source potential; a selecting switch, when closed, energizing the solenoid of the corresponding chain-actuating member and causing the latter's release to its operative, chain-engaging position and further causing said spring-loaded lever to move the double-switch operating rod, by way of said rod-turning arm to a position at which its blade-engaging arm will engage and move the center blade to break contact with said one outer blade and establish contact with that other, normally free outer blade, thereby energizing the motor for moving the shaft, the latter causing said chain-actuating member to first move in a direction opposite to that of the normal progress of the link chain, thereby disengaging the detent from the chain, and to then move in reverse direction, thus propelling the chain for a distance of one of its links.

11. In a coin-controlled vending machine as per claim 10, said operating structure further comprising a coin detector, a coin counter, a coin-director, a coin receptacle and coin discharge means, said coin counter comprising a coin passage leading from the coin detector, a micro-switch, a switch-actuating lever projecting into the passage and normally assuming a position in the path of a coin dropping through the passage and being adapted to close said switch when moved by a dropping coin; an electromagnet adapted to become energized by the closing of said switch and to attract and hold the lever in switch-closing position and out of the path of a coin; one of the terminals of said micro-switch being connected with that one outer blade of the double-switch which is normally contacted by said center blade, the latter being connected with that one source potential; the other terminal of the micro-switch being connected via said selecting switches with the other source potential; the disengagement of that one outer blade by said center blade of the double-switch causing the de-energizing of said coin-counter electromagnet, followed by the opening of the micro-switch and by the movement of the latter's lever into the path of a dropping coin.

12. In a coin-controlled vending machine as per claim 10, said operating structure further comprising a coin detector, a coin counter, a coin-director, a coin receptacle and coin discharge means, said coin-director including a coin passage from the coin counter, a housing and two chutes extending in divergent directions from the housing, a pivoted lever operative in the housing and having a coin rest at one end and a magnetic weight at its other end, electromagnets disposed at opposite sides of the weight and being adapted, when energized, to attract the latter, thus causing it and the lever to swing in one of two opposite directions for either returning a coin or for retaining it in the machine.

13. In a vending machine, a plurality of superimposed, spaced platforms for supporting merchandise, each platform having a merchandise discharge aperture, the apertures of all platforms being vertically aligned, each platform having an endless undercut raceway, an endless merchandise-moving link chain operative and guided in the raceway of each platform, actuating means for each chain, and electro-mechanical means for selectively operating any one of the chain-actuating means, said chain being composed of interconnected, interchangeable links provided with removable and interchangeable retainers for accommodating articles of merchandise and for moving such articles along the top surface of the platforms, said retainers having a flared upper edge and being open at top and bottom and clearing the platforms so that articles placed into the retainers are caused to rest upon the platforms, each platform having a weight-responsive electric switch adjacent the merchandise discharge aperture, said switch being normally in a circuit-opening position and being adapted to be operated to its circuit-closing position by the weight of an article held in a retainer when the latter assumes a position above the switch; the interior side of each chain link having a recess; an automatic stop element for said chain adapted to normally engage the recess of one of the links to prevent movement of the chain; said chain-actuating means being adapted, when operated, to first contact the chain, then to move the stop element to a chain-disengaging position, and finally to operatively engage and move the chain for a distance of one link length.

14. In a vending machine, a plurality of superimposed, spaced platforms for supporting merchandise, each platform having a merchandise discharge aperture, the apertures of all platforms being vertically aligned, each platform having an endless undercut raceway, an endless merchandise-moving link chain operative and guided in the raceway of each platform, actuating means for each chain, and electro-mechanical means for selectively operating any one of the chain-actuating means, said chain being composed of interconnected, interchangeable links provided with removable and interchangeable retainers for accommodating articles of merchandise and for moving such articles along the top surface of the platforms, said retainers having a flared upper edge and being open at top and bottom and clearing the platforms so that articles placed into the retainers are caused to rest upon the platforms, each platform having a weight-responsive electric switch adjacent the merchandise discharge aperture, said switch being normally in a circuit-opening position and being adapted to be operated to its circuit-closing position by the weight of an article held in a retainer when the latter assumes a position above the switch; the interior side of each chain link having a recess for engagement by said chain-actuating means when the latter are operated; an automatic stop element adapted to normally engage the recess of one of the links to prevent inadvertent movement of the chain, said chain-actuating means and said stop element having cooperating end portions adapted, when said chain-actuating means are operated, to first cause the disengagement of said stop element from the chain, whereupon the chain-actuating means operatively engage the chain and move the latter for a distance of one link length.

15. In a coin-controlled vending machine including a substantially closed cabinet and a hinged door for providing access to the interior of the cabinet, a door-operated switch normally closed by the closed door, a vending machine operating structure within the cabinet, the combination with said cabinet of a series of superimposed merchandise-supporting platforms having vertically aligned merchandise discharge openings, endless merchandise conveyers operative upon each of the platforms and adapted to facilitate the discharge of merchandise from any platform through said aligned openings to a point beneath the lowermost platform, said operating structure including electrically controlled means for moving said conveyers over the platforms, said means comprising a motor, a shaft passing through all of the platforms and actuated by the motor, a lever combination interposed between the motor and the shaft for translating the rotary movement of the motor into a limited arcuate movement for the shaft, and a solenoid-controlled conveyer-actuating member for each conveyer operated in a reciprocating fashion by said shaft.

16. In a coin-controlled vending machine including a substantially closed cabinet and a hinged door for providing access to the interior of the cabinet, a door-operated switch normally closed by the closed door, a vending machine operating structure within the cabinet, the combination with said cabinet of a series of superimposed merchandise-supporting platforms having vertically aligned merchandise discharge openings, endless merchandise conveyers operative upon each of the platforms and adapted to facilitate the discharge of merchandise from any platform through said aligned openings to a point beneath the lowermost platform, said operating structure including electrically driven means for moving said conveyers over the platforms and a plurality of electric control devices governing the operation of said conveyer moving means; said endless conveyers comprising link chains having recesses at their interior faces, engageable by said conveyer moving means, and merchandise-accommodating means at their exterior portions, said latter means being adapted to move individual articles of merchandise over the platforms; normally open weight-responsive switches disposed adjacent each of said discharge openings and being adapted to be closed by the weight of the articles of merchandise approaching said openings prior to the discharge of the merchandise through the openings.

17. In a vending machine, a plurality of independent superimposed, spaced, flat, continuous, stationary platforms, each platform having a single article-discharge aperture in its flat body, the apertures of all platforms being aligned vertically, an endless, horizontally movable chain of article retainers operatively supported by each of the platforms, said retainers being open at the top and at the bottom, individual actuating means for each of the chains provided on each platform for successively moving the chains a distance substantially equal to the width of one retainer and so that each retainer successively registers with the apertures of the platforms, and means common to all and passing through all platforms for selectively operating the actuating means for any one of the chains, said article retainers, when brought into registry with said platform apertures forming a substantially continuous chute for the passage of articles to a point beneath the lowermost platform, said platform having endless substantially channel-shaped raceways along which said chains operate and in which they are guided, each of said chains being composed of a series of interconnected links, each of said links comprising a one-piece structure having a substantially horizontal portion and a retainer-supporting frame extending at right angles from one, the outer side of that horizontal portion and being positioned to clear the platform supporting the chain, said horizontal portion having connecting holes at both ends, one end of the horizontal link portion being raised so that the other, unraised end can pass beneath the raised end of the next adjacent link, and a recess provided at the other, inner side of the horizontal link portion and being adapted for periodical engagement by said actuating means; connecting pins passing through the holes of each two adjacent links and having depending heads, the heads of the pins extending into and operatively engaging the raceways of the platforms and being guided within the latter, guide flanges for the pins provided in the raceways for preventing disengagement of the pins from the raceway; the retainer-supporting frame of each link being provided with means for removably holding article retainers in a platform-clearing position, and an article retainer removably associated with the frame of each of the links.

18. A coin-operated machine comprising in combination, a plurality of superimposed platforms, each platform having an endless raceway and an articulated endless conveyor operative therein, each adjacent element of the conveyor having holders for accommodating one parcel of merchandise so that the latter glides over the platform, each of the platforms having a merchandise-discharge opening in its body, the openings of all platforms being vertically aligned, weight-responsive switches adjacent to each of the discharge openings and being adapted to become actuated by the weight of merchandise approaching these openings; the merchandise holders of all platforms when aligned with said openings forming a continuous merchandise chute extending to beneath the lowermost platform, and a conveyor actuating mechanism for each platform for moving the conveyor periodically by way of the latter's elements a distance substantially corresponding to the length of such conveyer element, said weight-responsive switches controlling the operation of said actuating mechanisms.

19. A coin operated machine according to claim 18, and wherein the width of said holders substantially corresponds to the length of said conveyer elements.

20. A coin operated machine according to claim 18, and wherein for the operation of the conveyer actuating mechanism on each platform there extends through all platforms a single, oscillating shaft.

References Cited in the file of this patent
UNITED STATES PATENTS

| Number | Name | Date |
|---|---|---|
| 975,181 | Turnbull | Nov. 8, 1910 |
| 1,711,773 | Coffman | May 7, 1929 |
| 2,016,127 | Weiler | Oct. 1, 1935 |
| 2,057,950 | Howison | Oct. 20, 1936 |
| 2,103,391 | Scofield | Dec. 28, 1937 |
| 2,104,497 | Schulte | Jan. 4, 1938 |
| 2,233,379 | Cope | Feb. 25, 1941 |
| 2,351,432 | Jennings | June 13, 1944 |
| 2,363,724 | Ford | Nov. 28, 1944 |
| 2,464,737 | Wellekens | Mar. 15, 1949 |
| 2,531,238 | Tandler | Nov. 21, 1950 |
| 2,532,062 | Hall | Nov. 28, 1950 |
| 2,562,795 | Kelly | July 31, 1951 |
| 2,590,736 | Jandler | Mar. 25, 1952 |